ated Decem# UNITED STATES PATENT OFFICE.

JOHANN JAKOB BRACK, OF BASLE, SWITZERLAND, ASSIGNOR TO L. DURAND, HUGUENIN & CO., OF SAME PLACE.

SUBSTANTIVE RED DYE.

SPECIFICATION forming part of Letters Patent No. 531,149, dated December 18, 1894.

Application filed August 15, 1894. Serial No. 520,346. (Specimens.)

*To all whom it may concern:*

Be it known that I, JOHANN JAKOB BRACK, a citizen of the Swiss Republic, residing at Basle, Switzerland, have invented certain new and useful Improvements in the Manufacture of Substantive Cotton-Dyes, of which the following is a specification.

In carrying out the operations described in the United States Patents Nos. 516,752, 516,753, 516,754, and 516,755, for the manufacture of the condensation products therein described from formaldehyde and diamidodiphenyl bases, or from a mixture of similar diamidodiphenyl bases and mono- or diamins of the benzene group, I have observed that the strength of the acid employed as a condensation agent, the quantity of solvent employed, the temperature, and also the duration of the heating operation, have influences on the mass undergoing treatment, so as to change the character and constitution of the bases produced. For this reason it is generally impossible to obtain a homogeneous condensation product, a mixture being generally produced of several products, as diamido, triamido and tetramido bases as for example:

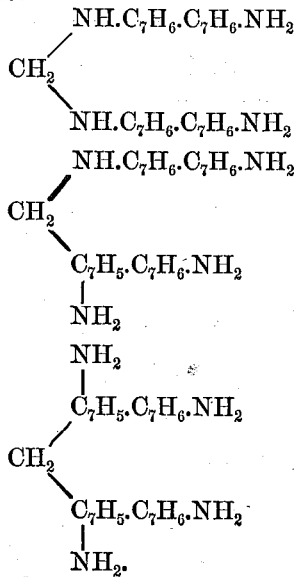

The relative proportions of the materials employed have an influence on the constitution and character of the resultant product also; that is to say, when the process is carried out on a large scale, the product of the reaction differs considerably from the product resulting from the use of small quantities of the materials, even though the conditions are unchanged. Hence it will be seen that a homogeneous product cannot be successfully or certainly obtained, the diamidobases produced according to the processes of the above mentioned patents always containing the higher amido bases although frequently in proportions so small as to be scarcely possible of detection with the aid of nitrite.

An increase of acid in the mixture is always attended by an increase in the production of the higher amido-bases; that is to say, the greater the quantity of acid employed to effect the condensation, the greater will be the quantity of nitrite required for diazotizing.

My present invention relates to a process of manufacture of substantive cotton dyes whereby a practically homogeneous product is obtained and the above mentioned uncertainties and disadvantages are obviated.

In the manufacture of dyes according to my improved process the following procedure is adopted:—21.2 kilograms of tolidin are dissolved in six hundred liters of water and twenty-four liters of hydrochloric acid of thirty-two per cent. strength are added. The solution thus prepared is heated to ebullition and to it are added four kilograms of a forty per cent. solution of formaldehyde. The mixture is then boiled for two hours, during which time the whole of the tolidin will have entered into the reaction. This may be definitely ascertained by precipitating the base with ammonia, and dissolving the precipitate in dilute sulfuric acid when, if the reaction is complete, the precipitate will be easily and completely dissolved. The solution of the product of this reaction in hydrochloric acid is directly diazotized, and for this about 10.5 kilograms of nitrite are required; that is to say one and one-half molecules of nitrite are required for each molecule of tolidin whence it is to be concluded that the product of the reaction has the formula:

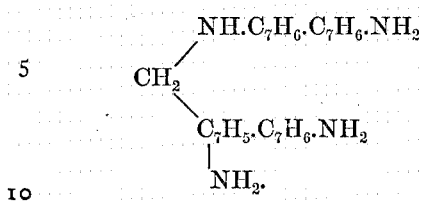

The base is precipitated by ammonia in the form of a brown mass fusing at about 40° centigrade, and distinguishable from the diamido-base produced from formaldehyde and tolidin as set forth in Patent No. 516,753 by its more ready solubility in benzene. It is also soluble in hot alcohol, but very slightly soluble in ether. Its hydrochlorate and sulfate dissolve readily in water. The base cannot be completely freed from water, for which reason the nitrite necessary for diazotizing 46.6 grams will always amount to something less than three molecules.

The hexazo compound is only partially soluble in water and forms with naphthionic acid, for instance, a substantive red hexazo dye which may be produced as follows:—The hydrochloric acid solution of the triamido-base obtained from 21.2 kilograms of tolidin, twenty-four liters of hydrochloric acid of thirty-two per cent. strength, and four kilograms of a forty per cent. solution of formaldehyde is treated with thirty-six liters of hydrochloric acid and then diazotized in the usual manner by means of 10.5 kilograms of nitrite. The resultant hexazo-compound is agitated and poured into a solution of thirty-seven kilograms of sodium naphthionate and forty kilograms of sodium acetate. After standing about twelve hours, the product of the reaction is treated with fifty kilograms of sodium carbonate. The mass is again left for about twelve hours and then heated to about 40° centigrade, after which the partially dissolved dyestuff is salted out, filtered and dried. It is a powder of brick-red color, soluble in hot water, and dyes unmordanted cotton red. Its solution in concentrated sulfuric acid is blue-violet, and by the addition of water thereto a dark blue precipitate is formed. The dye is slightly soluble in alcohol, and almost insoluble in glacial and dilute acetic acid. It dissolves in hot water with a brownish-red coloration, from which it is thrown down by the addition of hydrochloric acid in the form of a dark-gray precipitate.

In lieu of the naphthionic acid employed in the foregoing example other naphthylaminsulfo-acids may be substituted.

Having thus described my invention, I claim—

1. The herein described improvement in the manufacture of substantive cotton dyes, which consists in heating formaldehyde with tolidin in the presence of an excess of hydrochloric acid in dilute aqueous solution, substantially as set forth.

2. The herein described improvement in the manufacture of substantive cotton dyes, which consists in combining three molecules of a naphthylaminsulfo-acid with one molecule of the hexazo-derivative of the triamido-base derived from the condensation of formaldehyde with tolidin, substantially as set forth.

3. The herein described hexazo-coloring matter derived from alpho-naphthionic acid and the hexazo-derivative of the triamido-base produced by the condensation of formaldehyde with tolidin, said coloring matter being in the form of a brick-red powder which dyes unmordanted cotton red and being readily soluble in hot water with a brown-red coloration slightly soluble in alcohol, almost insoluble in glacial acetic acid and dilute acetic acid, and soluble in concentrated sulfuric acid with a blue violet coloration, substantially as set forth.

In witness whereof I have hereunto signed my name in the presence of two subscribing witnesses.

JOHANN JAKOB BRACK.

Witnesses:
GEORGE GIFFORD,
C. A. BURCKHARD.